United States Patent [19]

Sember

[11] Patent Number: 5,012,171
[45] Date of Patent: Apr. 30, 1991

[54] CONTROL SYSTEM FOR HIGH SPEED SWITCHED RELUCTANCE MOTOR

[75] Inventor: James W. Sember, Roanoke, Va.
[73] Assignee: General Electric Company, Salem, Va.
[21] Appl. No.: 351,505
[22] Filed: May 9, 1989
[51] Int. Cl.$^5$ .............................................. H02P 8/00
[52] U.S. Cl. .................................... 318/696; 318/685
[58] Field of Search ................................ 318/696, 685

[56] References Cited
U.S. PATENT DOCUMENTS

| | | | |
|---|---|---|---|
| 4,611,157 | 9/1986 | Miller et al. | 318/696 |
| 4,707,650 | 11/1987 | Bose | 318/685 |
| 4,739,240 | 4/1988 | MacMinn et al. | 318/696 |

OTHER PUBLICATIONS

J. T. Bass et al.; "Robust Torque Control of Switched-Reluctance Motors Without a Shaft-Position Sensor"; Aug. 1986; pp. 212–216 (IEEE Transactions on Industrial Electronics).

J. T. Bass et al.; "Simplified Electronics for Torque Control of Sensorless Switched Reluctance Motor"; IEEE Transactions, vol. 1E-34, No. 2, May 1987, pp. 234–239 (reprinted as pp. 373–378).

Primary Examiner—William M. Shoop, Jr.
Assistant Examiner—Saul M. Bergmann
Attorney, Agent, or Firm—Arnold E. Renner

[57] ABSTRACT

A method of controlling a switched reluctance motor during high speed operation in an operational range when the counter electromotive force exceeds the available DC source voltage and, therefore, the maximum desired converter current cannot be obtained, establishes torque control in a feedforward manner by controlling current pulse position.

6 Claims, 5 Drawing Sheets

CONTROL SYSTEM FOR HIGH SPEED SWITCHED RELUCTANCE MOTOR

This invention was made with Government support under prime contract DAAE07-84-C-R083 awarded by the Department of Defense. The Government has certain rights in this invention.

BACKGROUND OF THE INVENTION

This invention relates generally to motor controls and, more particularly, to a control system and method of control for a switched reluctance motor.

Switched reluctance motors conventionally have multiple poles or teeth on both stator and rotor, i.e., they are doubly salient. There are phase windings on the stator but no windings on the rotor. Each pair of diametrically opposite stator poles is connected in series to form one phase of a multi-phase switched reluctance motor. Torque is produced by switching current into each of the phase windings in a predetermined sequence that is synchronized with the angular position of the rotor, so that a magnetic force of attraction results between the rotor and stator poles that are approaching each other. The current is switched off in each phase before the rotor poles nearest the stator poles of the phase rotate past the aligned position. Otherwise, the magnetic force of attraction would produce a negative or braking torque. The torque developed is independent of the direction of current flow so that unidirectional current pulses synchronized with rotor movement can be applied to develop torque in either direction. These pulses are generated by a converter using current switching elements such as thyristors or transistors.

In operation, each time a phase of the switched reluctance motor is switched on by closing a switch in a converter, current flows in the stator winding of that phase, providing energy from a direct current (DC) supply to the motor. The energy drawn from the supply is converted partly into mechanical energy by causing the rotor to rotate toward a minimum reluctance configuration and partly in stored energy associated with the magnetic field. After the switch is opened, part of the stored magnetic energy is converted to mechanical output and part of the energy is returned to the DC source.

U.S. Pat. No. 4,707,650 describes a control system for a switched reluctance motor employing a programmable, closed loop, four quadrant control system incorporating feedback control, angle control and current control. The feedback control incorporates a speed feedback loop and/or a torque feedback loop. The angle control digitally synchronizes stator phase current pulses with rotor position, and the current control acts as a chopping or bang-bang controller to limit the magnitude of the stator phase current pulses. The magnitude and turn-on and turn-off angles of the stator current pulses for each phase, in feedback mode, are controlled so as to provide smooth operation and full torque and speed range with optimum performance in all four quadrants of motor operation, i.e., forward motoring, forward braking, reverse motoring and reverse braking.

The closed loop feedback control processes an actual motor speed signal and an operator command to generate a current command, which serves to limit magnitude of actual phase current, and also generates a turn-on angle signal and a pulse width angle signal which are coordinated with a particular quadrant in which the motor is operating. The values of turn-on angle and pulse width angle are programmable for different quadrants of operation. For motoring quadrants, the turn-on angle signal is directly proportional to the current command while the pulse width angle signal is a function of the current command and actual motor speed.

The digital angle control processes rotor position information signals to generate a multi-phase sync pulse train and individual stator phase signals for the respective stator phases. The angle control also generates a resolution signal with the desired angle resolution. The angle control employs the resolution signal and the individual stator phase sync signals to convert a turn-on angle signal and a pulse width angle signal into corresponding current pulses synchronized with rotor position for each of the stator phases.

The current control compares the current command from the feedback control with actual current in each stator phase to generate a current magnitude limiting signal and couples this signal with the pulse train for each phase from the angle control to generate the stator current control pulses applied to the switching elements in the motor power converter.

While the disclosed system provides for suitable control of a switched reluctance motor, it is believed that further improvement and operation can be attained over a relatively broad low speed range, e.g., for speeds up to about 16,000 rpm, by providing a control system which assures that winding current reaches its commanded set point value at a commanded angle. This desirable feature, which is addressed in one form in U.S. Pat. No. 4,933,620 "Control System for Low Speed Switched Reluctance Motor" by S. R. MacMinn and J. W. Sember issued June 12, 1990, is important to the operation of the switched reluctance motor over a wide speed range because the counter electromotive force (CEMF) in the motor is a function of the angular velocity of the rotor of the motor. For example, with the same set of turn-on and turn-off angles at higher speed, the CEMF is positive in polarity at the beginning of a current pulse, thus opposing the injection of current into the winding, while the end of the current pulse may extend past the alignment position causing the CEMF to become negative in polarity and forcing current to be retained in the winding. The amount of delay in the current pulse reaching its desired value is a function of current level, speed and position of the current pulse. The effect, given a fixed set of turn-on and turn-off angles, is to greatly reduce the amount of motoring torque that can be produced as speed increases thus causing the torque, as a function of current, to become a strong function of motor speed.

As is described above, increasing motor velocity results in generation of a larger CEMF. At some point, the CEMF becomes sufficiently large and limits motor current such that commanded current cannot be achieved. At speeds above this point, some method of control must be used other than current control or motor torque cannot be regulated.

SUMMARY OF THE INVENTION

It is an object of the present invention to provide an improved control system for operating a switch reluctance motor at speeds wherein the generated CEMF limits current control.

The present invention, in one form, comprises a method of controlling a switched reluctance motor during high speed operation in response to a torque command. In the disclosed method, a desired motor current is established at a magnitude higher than can be attained with available source voltage so that the current control loop does not interfere with the torque control loop. A dwell angle or time of duration of motor current is set as a function of the input torque command, the motor velocity and the magnitude of the source voltage. A turn-on angle is then computed as a function of the dwell angle, the source voltage and the motor velocity. Finally, a turn-off angle is generated by adding the dwell angle to the turn-on angle. The disclosed method preferably computes the dwell angle by first establishing a minimum dwell angle, referred to as a dwell offset angle, and adding the dwell offset angle to the product of torque command and motor velocity, which product is normalized by multiplying by a fixed constant selected to optimize system efficiency. The normalized value of source voltage, that is, source voltage multiplied by another selected constant, is substracted from the combination of the dwell offset angle and torque command motor velocity product to yield the dwell angle. The constant selected before normalizing the components of the relationship may be selected by curve fitting in a manner well known in the art. The turn-on angle ($\theta_o$) is preferably computed as a function of the dwell angle, in accordance with the ($\theta_{pw}$) equation:

$$\theta_o = G3(\theta_{pw}) - G4(\theta_{pw}) \times V_d - G5 V_d + G6(\omega_r) + \text{Turn-on offset angle}$$

where turn-on offset angle is a selected minimum turn-on angle, $V_d$ represents source voltage, $\omega_r$ represents motor velocity and constants G3, G4, G5 and G6 are empirically selected such that the turn-on angle decreases as source voltage increases with constant dwell angle, and increases as dwell angle increases with constant source voltage.

BRIEF DESCRIPTION OF THE DRAWINGS

The foregoing and other objects, features and advantages of the present invention will be apparent from the following detailed description of the invention when read in conjunction with the accompanying drawings in which.

DETAILED DESCRIPTION OF THE INVENTION

Figures 1A, 3:
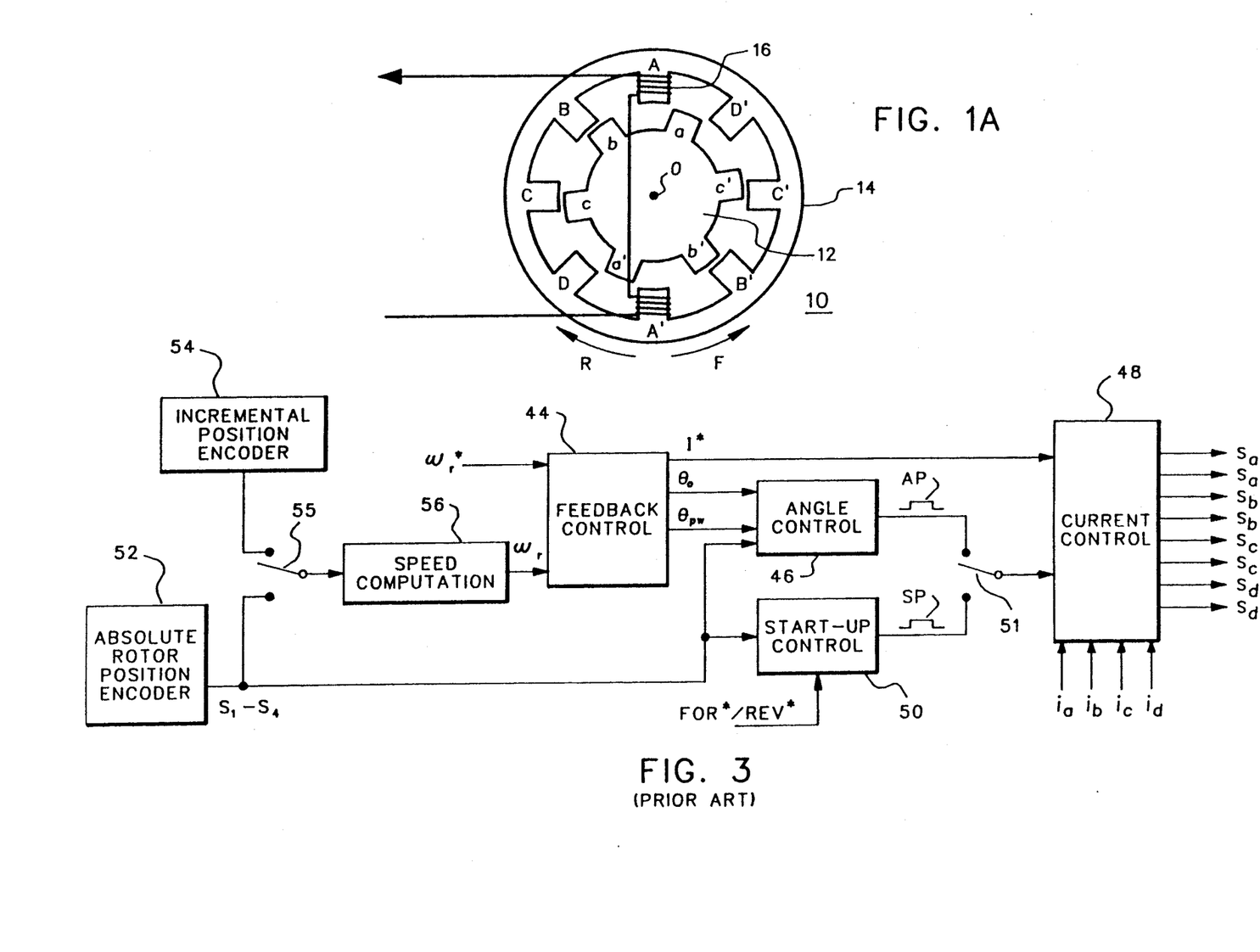
FIG. 1A is a schematic representation of a typical switched reluctance motor.
FIG. 3 is a simplified functional block diagram of a switched reluctance motor control system in accordance with the prior art with which the present invention may be used.

FIG. 1A is a schematic representation of a typical switched reluctance motor 10 including a rotor 12 rotatable in either a forward or a reverse direction within a stator 14. The forward direction F indicates counterclockwise rotation of the rotor while the reverse direction R indicates clockwise rotation. Rotor 12 has three pairs of diametrically opposite poles labeled a—a', b—b' and c—c'. Stator 14 is provided with four pairs of diametrically opposite stator poles labeled A—A', B—B', C—C' and D—D'. For purpose of discussion, the illustrated embodiment is assumed to be constructed such that each rotor pole and each stator pole has an angular extent of 18°. The circumferential spacing or gap between adjacent rotor poles in this embodiment is 42° while the gap between adjacent stator poles is 27°. These angles are measured with respect to center point 0.

The opposite poles of each stator pole pair share a common winding and define a respective stator phase. A representative winding coil 16 for phase A is illustrated in FIG. 1A. Similar windings are provided for each of the other stator pole pairs.

Rotor rotation is produced by switching current on and off in each stator phase winding in a predetermined sequence synchronized with angular position of the rotor. Current in each stator phase is derived from power converter 20 of FIG. 1B, which impresses a DC link voltage $V_d$ across the four parallel stator phase legs PH-A, PH-B, PH-C and PH-D. Link voltage $V_d$ can be obtained from a battery (not shown), or from an AC power supply, e.g., three phase, 220 volt, 60 Hertz line, through a conventional diode rectifier circuit 22 and filtering capacitor 23.

Figure 1B:
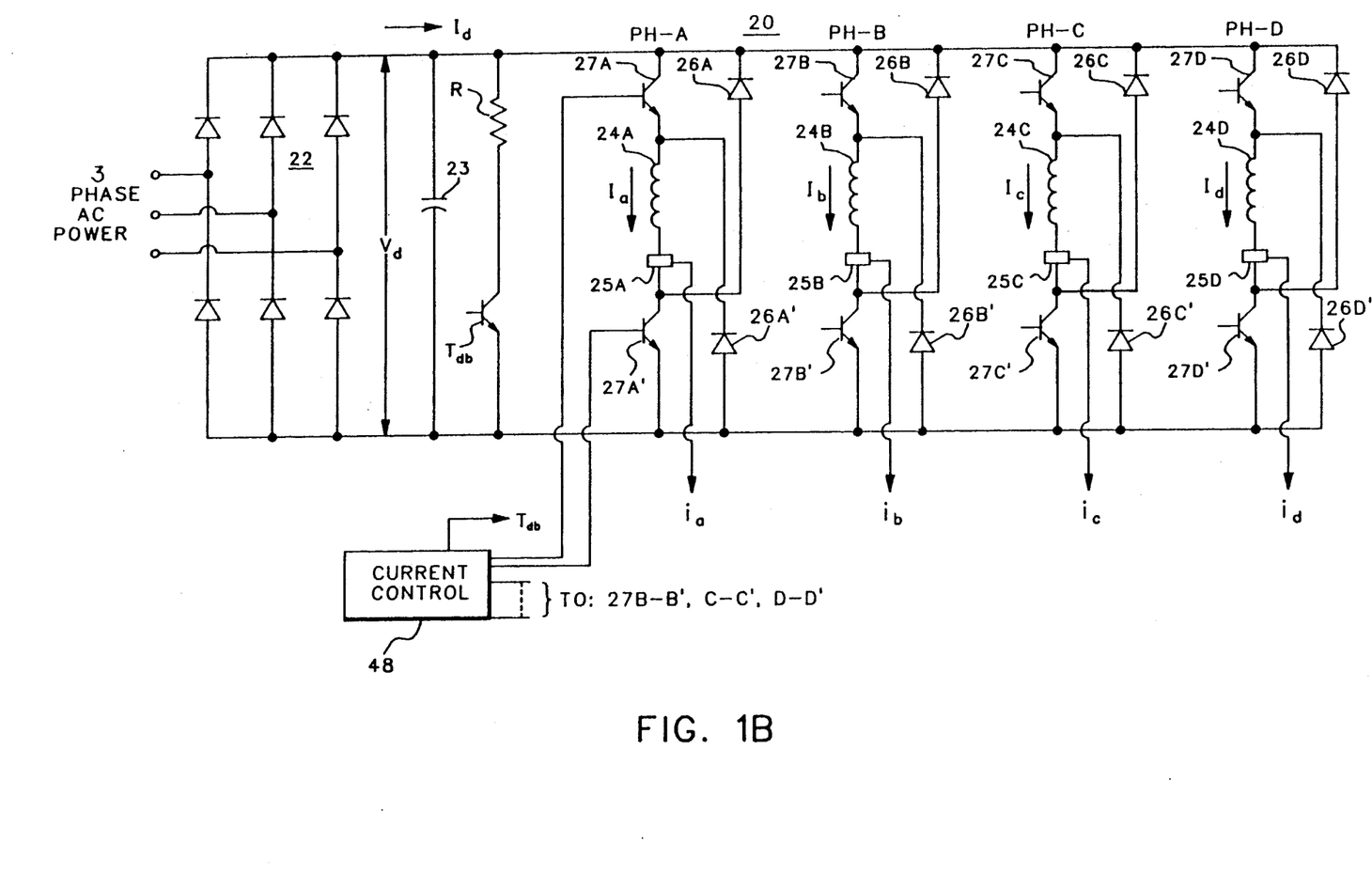
FIG. 1B illustrates a typical power converter for the switched reluctance motor of FIG. 1A.

The converter circuitry for each stator phase leg is identical. The PH-A leg, for example, includes a stator winding 24A, first and second flyback diodes 26A and 26A' and first and second current switching devices such as transistors 27A and 27A' interconnected as shown in FIG. 1B. A base of each of the transistors is connected to an output of the current control 48.

When transistors 27A and 27A' are switched on, a phase current $I_a$, derived from link current $I_d$ flows through the stator winding for phase A. When the transistors 27A and 27A' are switched off, current in the winding 24A decays by re-circulating to the source or to the filter capacitor 23 through the flyback diodes 26A and 26A'. During braking, a dynamic brake transistor $T_{db}$ in series with a resistor R across the rectified AC source is switched on to dissipate recovered energy in resistor R rather than transferring it into capacitor 23. Alternately, with a battery power supply, the energy could be absorbed by the battery. A signal, $i_a$, representative of a phase current $I_a$, is generated by any suitable means, 25A, such as a shunt or a current transducer such as that commercially provided by Liaisons Electroniques Mechaniques S. A. of Geneva, Switzerland.

Figures 2A, 2B:
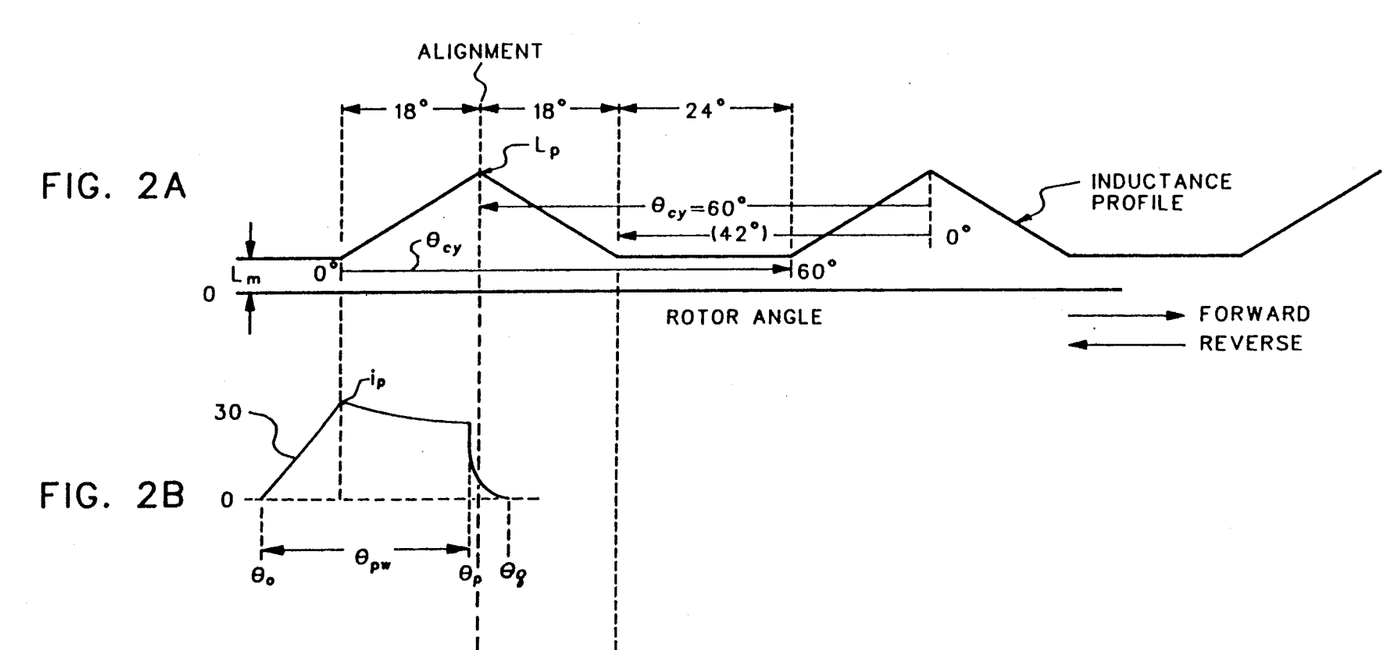
FIG. 2A profiles inductance with respect to rotor angular position for a stator pole pair of the motor of FIG. 1A.
FIGS. 2B and 2C illustrate typical stator phase current pulses for forward motoring and reverse motoring, respectively.
Figure 2C:
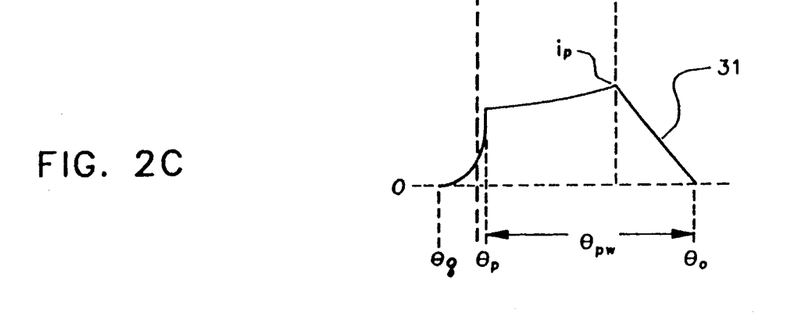

The converter circuitry for each of the other phase legs operates identically and accordingly is not detailed herein. The transistors coupled in series with each of the phase windings are made to conduct in sequence, with the order of conduction depending upon the direction of rotation. In the illustrative embodiment, a particular phase is fired periodically with a cycle period 60° with respect to rotor position and, therefore, for the four phase machine, consecutive phases are fired at 15° intervals. The timing and wave shape of stator phase current pulses for different quadrants of operation are shown in FIGS. 2A-2C. The inductance profile of a stator pole pair, e.g., phase A, with respect to rotor angular orientation is shown in FIG. 2A, while typical stator phase current pulses for the various quadrants are illustrated in FIGS. 2B-2C. The inductance profile has a cycle period $\theta_{cy}$ equal to 60° and the distribution of rising inductance, falling inductance and minimum inductance periods, for both forward and reverse direction rotations and reference frames, is shown in FIG. 2A. For forward rotation, the inductance increases for the first 18°. At 18°, a rotor pole is aligned with a stator pole and peak inductance $L_p$ is achieved. From 18°—36°, the inductance falls and for the next twenty-four degrees remains at a minimum inductance $L_m$, then the cycle repeats. For reverse rotation, the inductance falls from 0° to 18°, remains at a minimum inductance $L_m$ from 18° to 42°, and then rises to the peak inductance $L_p$ from 42° to 60°.

Examining FIGS. 2A and 2B, it will be seen that in a forward motoring (FM) quadrant, the stator current pulse 30 is established where the inductance profile has a positive slope. Current I is switched on at a turn-on angle $\theta_O$ and rises linearly to the magnitude of $i_p$ at the corner point (0°) of the inductance profile. Current I is maintained substantially constant by chopping or bang-bang control and is controlled such that I is essentially equal to the commanded current I*. The transistor switches coupled in series with the winding 24 are switched off at a turn-off angle $\theta_p$, which is a few degrees ahead of the peak inductance $L_p$ point, so that the angle $\theta_q$, at which the current reaches zero, occurs only slightly into the negative inductance slope region. A pulse width angle $\theta_{pw}$ extending from the transistor turn-on angle $\theta_O$ to the transistor turn-off angle $\theta_p$ is shown in FIG. 2B. At high speed, the machine CEMF dominates and bang-bang current control is lost.

As shown in FIG. 2C, current pulse wave shape 31, at high speed and reverse motoring (RM) is identical to that in forward motoring, except that it is reversed in direction and occurs during the opposite slope of the inductance profile, which appears as a positive slope in the reverse direction.

The basic control parameters of the switched reluctance motor drive system can be summarized as follows:

I is the chopping current level;
$\theta_O$ is the transistor turn-on angle;
$\theta_p$ is the transistor turn-off angle; and
$\theta_{pw}$ is the dwell angle, difference between $\theta_o$ and $\theta_p$.

Referring now to FIG. 3, there is shown a simplified functional block diagram of one form of control system for a switched reluctance motor with which the present invention may be advantageously used. The basic control system includes feedback control block 44, angle control block 46, and current control block 48. In addition, a start-up control block 50, and absolute rotor position encoder block 52 and incremental position encoder block 54 and a speed calculator block 56 are included.

Feedback control block 44 may comprise a speed loop, a torque loop or a speed loop with an inner torque feedback loop. As illustrated, FIG. 3 incorporates a speed loop. The feedback control receives an operator command, e.g., speed command $\omega_r^*$ and an actual speed signal $\omega_r$ from speed computation block 56. The closed loop feedback control processes the operator command and actual speed signal to generate a current command I*, a turn-on angle signal $\theta_O$ and a pulse width angle signal $\theta_{pw}$. The values of the turn-on angle and pulse width angle signals may be independently programmable for different quadrants of operation. For example, the turn-on angle signal may be made directly proportional to the current command, and the pulse width angle signal or turn-off angle signal is made a function of the current command and actual motor speed. A detailed description of one form of implementation of feedback control 44 may be had by reference to the aforementioned U.S. Pat. No. 4,707,650.

Angle control 46 receives the turn-on angle signal $\theta_0$ and the turn-off or pulse width angle signal $\theta_{pw}$ from feedback control 44, and rotor position information signals $S_1$, $S_2$, $S_3$ and $S_4$ from encoder 52. The angle control digitally processes these signals to provide mutually phase shifted pulse trains for the different stator phases, each pulse train comprising conduction angle pulses synchronized with the rotor position and coordinated with an inductance profile of the motor in accordance with the selected quadrant of motor operation.

Current control 48 receives the current command I* from feedback control 44, the actual current representative signals $i_a$, $i_b$, $i_c$ and $i_d$ for each stator phase, and the pulse trains from angle control 46. The current control processes these signals to provide switching control signals $S_a$—$S_a'$, $S_b$—$S_b'$, $S_c$—$S_c'$, and $S_d$—$S_d'$ to the base terminals of transistor pairs such as, for example, transistor pair 27A and 27A' in FIG. 1B. The current control preferably operates on a bang-bang control principle and serves to maintain the amplitude of actual current in each stator phase within the hysteresis band of the current command, up to a base motor speed, and limits peak amplitude of actual current in each stator phase to the maximum value of the hysteresis band beyond the base speed.

The control system preferably includes a starter control 50 for initiating rotor rotation. One example of a start-up control is shown in U.S. Pat. No. 4,713,594 entitled "Start-Up Control For Switch Reluctance Motor" by B. K. Bose and P. M. Szczesny.

Absolute rotor position encoder 52 provides position information signals $S_1$-$S_4$, indicative of instantaneous rotor position, for pulse synchronization purposes, to angle control 46 and start-up control 50. The same rotor position information signals can advantageously be processed by speed calculator 56 to generate the actual speed signal $\omega_r$.

Figure 4:
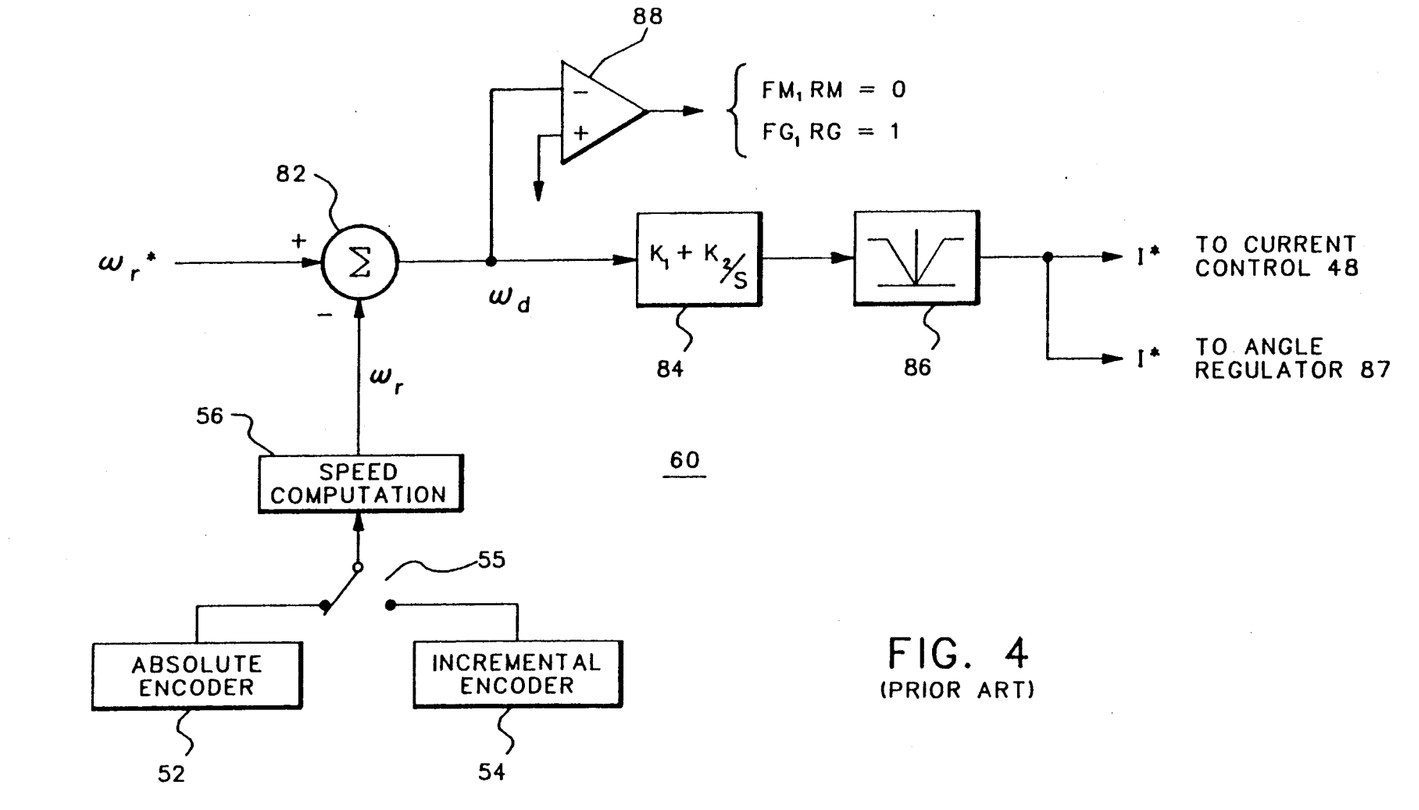
FIG. 4 is an illustration in block diagram form of a typical prior art method and apparatus for generating a current command from motor speeds.

A complete description of the operation of the control system of FIG. 3 is set forth in U.S. Pat. No. 4,707,650. The present invention provides an improvement to the feedback control block 44 to provide more accurate and better tracking of the $\theta_0$ and $\theta_{pw}$ angles for providing turn-on and turn-off commands to the angle control block 46 during high speed forward and reverse motoring. Before describing an implementation of the present invention, reference is first made to FIG. 4, where there is illustrated a speed control loop 60 which can be used to implement feedback control 44 of FIG. 3. The control loop 60 includes a summation circuit 82 for comparing a speed command $\omega_r^*$ with actual speed $\omega_r$ and generating a speed difference signal $\omega_d$ therefrom. Speed command $\omega_r^*$ is operator input while the actual speed is calculated by speed calculator 56 from rotor position information signals provided by either absolute encoder 52 or incremental encoder 54 as was described with regard to FIG. 3. This speed difference signal from summation circuit 82 is processed by a proportional plus-integral compensator 84 and absolute value circuit 86 to produce current command I*. The speed difference signal is also applied to the negative input of a polarity detector 88, the positive input of which is grounded. The output signal of polarity detector 88 is used to differentiate between motoring quadrants and generation quadrants and may be employed to coordinate turn-on and pulse width angles with motor operating quadrants. Current command I* is provided to the current control 48 as shown in FIG. 3.

The system described in earlier referenced U.S. Pat. No. 4,933,620 provides for control of a switched reluctance motor over a relatively low speed range, e.g., from a minimum speed up to about 15,000 RPM for one particular type of motor. The low speed range can be characterized as that range over which the CEMF of the motor does not become so significant that full converter current cannot be attained. In the high speed range, the CEMF becomes so large that full converter current is not attainable. Operation in the high speed range is in a constant power mode and torque control is maintained by setting the commanded current I* to its maximum value and varying the turn-on angle $\theta_o$, and the turn-off angle $\theta_p$, of the current pulses applied to each phase winding.

Referring again to FIGS. 2B and 2C, the effect of high speed operation on each phase current waveform is to slow the current pulse rise time and force a current reduction as the motor inductance rises. The transistors, e.g., transistors 27A—27A', are gated into conduction such that current is applied to phase winding 24A in advance of the associated rotor pole becoming aligned with the stator pole. Current builds in the phase winding until the CEMF reaches a value such that it forces the current to begin to decrease. The magnitude of current in the winding does not reach the commanded current level. Thus, current magnitude becomes a function of turn-on angle, the length of the current pulse, (the time between gating transistors 27A—27A' into conduction and removal of the gating signal), the magnitude of source voltage $V_d$, and the magnetic characteristics of the motor. Direct control of current is not feasible.

The present invention controls torque of a switched reluctance motor in a high speed operating mode in an approximately linear manner using a feed forward control. The control variables are turn-on angle and current pulse width angle $\theta_{pw}$, also referred to as the dwell angle. The dwell angle is preferably determined from the relationship:

$$\theta_{pw} = G1(T^*)(\omega_r)^n + (D_o) - G2(V_d)$$

where T* is the commanded torque, $\omega_r$ is rotor velocity, $D_o$ is a preselected offset, e.g., the difference between the turn-off angle and the turn-on angle selected for low speed operation or a smaller value, and $V_d$ is the magnitude of supply voltage applied to the motor phase windings. The constants G1 and G2 and the coefficient "n" are determined by empirical curve fitting.

It may be noted that the control system shown in FIG. 3 illustrates a speed control loop. As will be apparent to one of ordinary skill in the art, the system could be based on a torque control loop. The dwell time relationship set forth above assumes a torque control system in which commanded torque T* is the primary control input.

Once a preferred dwell angle has been established, the turn-on angle can be determined from the following equation:

$$\theta_o = G3(\theta_{pw}) - G4(\theta_{pw}) \times V_d - G5(V_d) + G6(\omega_r) + \text{Turn-on offset angel}$$

where turn-on offset angle is a selected minimum turnon angle and G3, G4 and G5 are selected such that the turn-on angle, measured in degrees before alignment, decreases as voltage $V_d$ increases (dwell being held constant) and increases as dwell angle increases ($V_d$ being held constant). As earlier indicated, the turn-off angle is equal to the turn-on angle plus the dwell angle.

While the form of the above equations are suitable for torque control of switched reluctance motors generally, the gains G1-G6 and the coefficient n may change from motor to motor. The gains G1-G6 and coefficient n are best determined from well known curve fitting techniques. In particular, both system efficiency and output torque may be plotted as a function of turn-on angle and dwell angle for various different motor speeds and DC voltages. System efficiency is defined as output power (torque×speed) divided by input power (volts×current). This plotting will yield a family of curves for each motor. The gains G1, G2 and coefficient n are then selected to maximize efficiency over the dwell range. Since different types and sizes of motors will have different magnetic characteristics and different number of poles and pole dimensions, the values of G3-G6 are necessarily empirically determined for each different motor.

Figure 5:
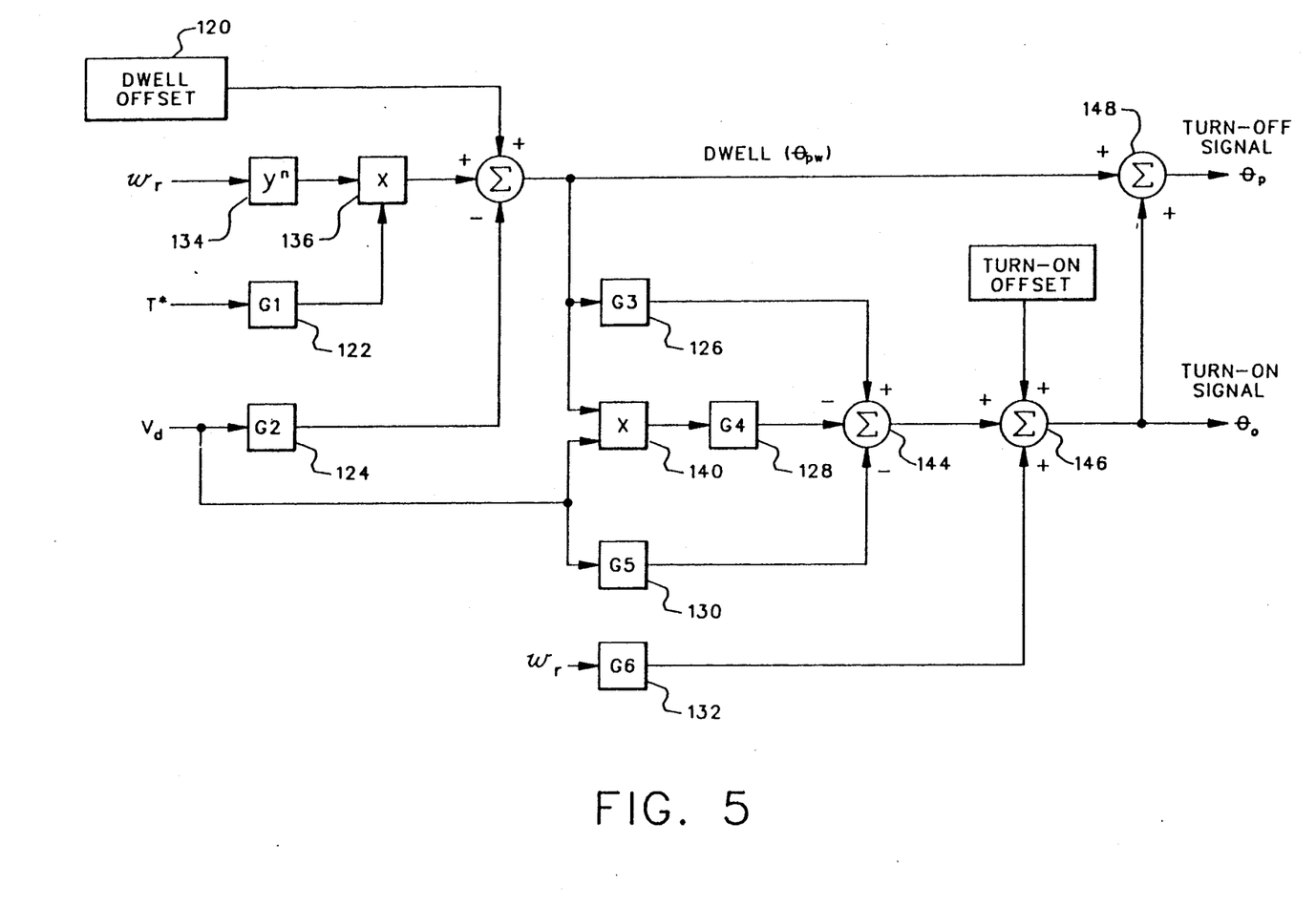
FIG. 5 illustrates one implementation in simplified block diagram form of a system for generating turn-on and turn-off angle signals in accordance with the present invention.

Referring to FIG. 5, there is shown one implementation of the present invention in block diagram form for generating turn-on and turn-off angle signals. The system of FIG. 5 may be used for high speed motoring to effect a torque control. The dwell offset angle, indicated at block 120, is a preselected minimum angle between occurrence of the turn-on and the turn-off angle signals. The torque command T* is an external command for a desired torque. The block diagram of FIG. 5 may be implemented in hardware, e.g., using commercially available amplifiers for gain blocks 122, 124, 126, 128, 130 and 132, using commercially available multiplier circuits for blocks 134, 136 and 140 and summing the various signals from the circuit blocks using resistor/amplifier networks. The generated turn-on and turn-off signals may be analog signals whose amplitude is used to generate timed signals in manner well known in the art such as, for example, by intergration and comparison to preselected levels. However, the system of FIG. 5 is preferably implemented in a microcomputer whereby the turn-on and turn-off signals may be digitally generated as gating signals and termination of gating signals for directly controlling transistors 27A—27A' et al. in FIG. 1B.

It will be seen that the block diagram of FIG. 5 is a substantially direct implementation of the dwell angle and turn-on angle equations set forth above. The velocity signal $\omega_r$ is applied to function block 134 where it is raised to the power n, n having been selected to provide a curve fit as described above. The resultant $\omega_r^n$ is applied to multiplier 136. The torque command T* is coupled to amplifier 122 and the amplified signal $G1 \times T^*$ is coupled as a second input to multiplier 136. The multiplier 136 produces the product $G1T^*\omega_r^n$. The signal $V_d$ representing the magnitude of the voltage applied to the phase windings is coupled to the amplifier 124 and the resultant amplified signal $G2V_d$ is applied to a summing juction 142. The signal $G1T^*\omega_r^n$ from multiplier 136 is also coupled to the summing junction 142 as is the dwell offset signal. The summing junction 142 sums the dwell offset signal with the signal from the multiplier 136 and subtracts from that combination the amplified supply voltage signal $G2V_d$. The resultant signal from summing junction 142 is the dwell angle signal.

The turn-on signal is developed as described above by combining the dwell angle signal from the summing junction 142 with a turn-off offset signal. In particular, the dwell angle signal is applied to amplifier block 126 to produce the signal $G3 \times$ dwell angle. This signal is then applied to one input terminal of a summing block 144. The dwell angle signal is also applied to multiplier block 140 where it is multiplied by the signal $V_d$ representing the magnitude of supply voltage. The resultant signal $V_d \times$ dwell angle from block 140 is coupled through amplifier block 128 and then to another input terminal of the summing junction 144. The $V_d$ signal is also amplified in block 130 to produce $G5 \times V_d$ and then this signal is coupled to another input terminal of the block 144. The summation signal from block 144 is coupled to one input terminal of another summing junction 146. The speed signal $\omega_r$ is amplified in block 132 and coupled to another input terminal of summing junction 146. A third input terminal of the summing junction 146 is connected to receive the turn-on offset signal described above. The signal developed at the output of the summing junction 146 is the turn-on angle signal. The turn-off signal is produced by combining the turn-on angle signal with the dwell angle signal from block 142 in a summing junction 148 to produce the turn-off signal. In other words, the turn-off signal is developed by adding the dwell angle signal to the turn-on signal.

The implementation of the turn-on and turn-off signal generating system of FIG. 5, with proper selection of the gains of the function blocks 122-132, causes the transfer function of machine output torque versus torque command to become linear over a wide range of motor speeds, applied voltage and torque. By determining the gains G1-G6 from the plots of both system efficiency as a function of dwell and turn-on angles, and output torque as a function of dwell and turn-on angles, the control has the advantage that the drive system efficiency is maintained at high levels over a broad range.

While the invention has been described in what is presently considered to be a preferred embodiment, it will be appreciated that other modifications and variations of the invention can be made without departing from the spirit and scope of the invention. Accordingly, it is intended that the invention not be limited to the disclosed embodiment but be interpreted within the full spirit and scope of the appended claims.

What is claimed is:

1. A method of controlling a switched reluctance motor during high speed operation in response to a torque command T*, the method comprising the steps of:

rendering ineffective any control loop response to a current command;

setting a dwell angle of the desired motor current as a function of the torque command, the motor velocity and the magnitude of source voltage;

computing a turn-on angle for the desired motor current as a function of the dwell angle, the source voltage and the motor velocity; and generating a turn-off angle for the desired motor current as the sum of the dwell angle and the turn-on angle.

2. A method of operating a multi-phase switched reluctance motor at a motor velocity $\omega_r$ from a direct current power source having a nominal output voltage $V_d$, the motor having a plurality of winding phases on associated stator poles and a plurality of salient rotor poles, each winding phase of the motor being connected to the power source through corresponding selectively controllable switching devices, each of the switching devices being controlled by an angle control system responsive to a commanded torque T* for sequentially gating each of the switching devices into conduction at a turn-on angle for applying power to the winding phase prior to alignment of the corresponding stator poles with a rotor pole and for gating each of the switching devices out of conduction at a selected turn-off angle, each angle being positioned with respect to alignment of corresponding rotor and stator poles, the method comprising the steps of:

determining a dwell angle during which current is to be applied to each winding phase as a function of the commanded torque, motor velocity and the power source output voltage;

sequentially gating the switching devices into conduction at a turn-on angle computed from the determined dwell angle such that the dwell angle extends over a region in advance of alignment of the corresponding stator poles and rotor poles; and gating the switching devices out of conduction at a turn-off angle displaced from the turn-on angle by the dwell angle.

3. The method of claim 2 wherein the determining step includes the steps of:

obtaining data representative of velocity of the rotor of the switched reluctance motor;

multiplying the velocity data by the commanded torque and normalizing the resultant product by multiplication by a first constant selected to optimize system efficiency;

selecting a dwell offset corresponding to a preselected minimum dwell angle;

normalizing the source voltage $V_d$ by multiplication by a second constant selected to optimize system efficiency; and summing the normalized resultant product and the dwell offset and subtracting therefrom the normalized source voltage for determining the dwell angle.

4. The method of claim 1 wherein the setting step comprises computing a dwell angle in accordance with the relationship:

$$\theta_{pw} = G1(T^*)(\omega_r)^n + (D_o) - G2(V_d)$$

wherein;

$\theta_{pw}$ = dwell angle
T* = torque command
$\omega_r^n$ = motor velocity raised to the power "n"
$D_o$ = dwell offset angle selected to be a minimum dwell angle
$V_d$ = source voltage, and,
$G_1$ and $G_2$ = constants selected for optimum system efficiency.

5. The method of claim 1 wherein the computing step comprises computing the angle in accordance with the following relationship:

$$\theta_o = G3(\theta_{pw}) - G4(\theta_{pw}) \times V_d - G5(V_d) + G6(\omega_r) + \text{turn-on offset angle},$$

wherein $\theta_o$ is the turn-on angle, $\theta_{pw}$ is the dwell angle, and where turn-on offset angle is a selected minimum turn-on angle, $V_d$ represents source voltage, $\omega_r$ represents motor velocity and G3, G4, G5 and G6 are constants selected such that the turn-on angle decreases as source voltage increases with constant dwell angle, and increases as dwell angle increases with constant source voltage.

6. The method of claim 3 wherein the turn-on angle is computed from the relationship:

$$\theta_o = G3(\theta_{pw}) - G4(\theta_{pw}) \times V_d - G5(V_d) + G6(\omega_r) + \text{turn-on offset angle}$$

wherein; $\theta_o$ is the turn-on angle, $\theta_{pw}$ is the dwell angle, where turn-on offset is a selected minimum turn-on angle and G3, G4, G5 and G6 are constants selected for providing a linear relationship between motor torque and commanded torque.

* * * * *